(12) United States Patent
Madhvanath et al.

(10) Patent No.: US 8,341,556 B2
(45) Date of Patent: Dec. 25, 2012

(54) METHOD AND SYSTEM FOR ATTENTION-FREE USER INPUT ON A COMPUTING DEVICE

(75) Inventors: Sriganesh Madhvanath, Karnataka (IN); Dinesh Mandalapu, Karnataka (IN); Ajay Gupta, Karnataka (IN); Shekhar Ramachandra Borgaonkar, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 859 days.

(21) Appl. No.: 12/030,204

(22) Filed: Feb. 13, 2008

(65) Prior Publication Data
US 2008/0288896 A1  Nov. 20, 2008

(30) Foreign Application Priority Data

Apr. 30, 2007 (IN) .............................. 918/CHE/2007

(51) Int. Cl.
*G06F 3/048* (2006.01)
(52) U.S. Cl. ........................................ 715/863; 382/185
(58) Field of Classification Search .................. 715/863; 382/185
See application file for complete search history.

(56) References Cited

U.S. PATENT DOCUMENTS

| 5,796,867 | A * | 8/1998 | Chen et al. ..................... 382/187 |
| 6,694,056 | B1 * | 2/2004 | Ito et al. ........................ 382/186 |
| 6,970,599 | B2 * | 11/2005 | Longe et al. .................. 382/185 |
| 7,257,528 | B1 * | 8/2007 | Ritchie et al. ..................... 704/7 |

* cited by examiner

*Primary Examiner* — Tuyetlien Tran
*Assistant Examiner* — Peiyong Weng

(57) ABSTRACT

A method and system for attention-free user input on a computing device is described that allows the recognition of a user input irrespective of the area of entry of the user input on a writing surface (such as a digitizer) without the user having to make a visual contact with the writing surface.

13 Claims, 4 Drawing Sheets

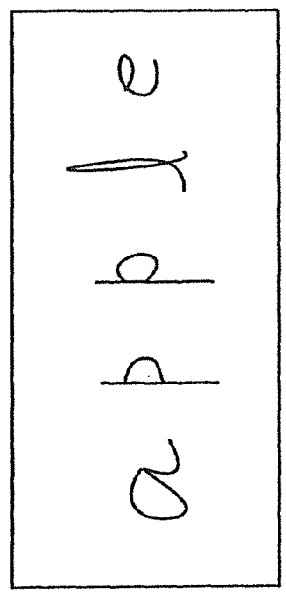 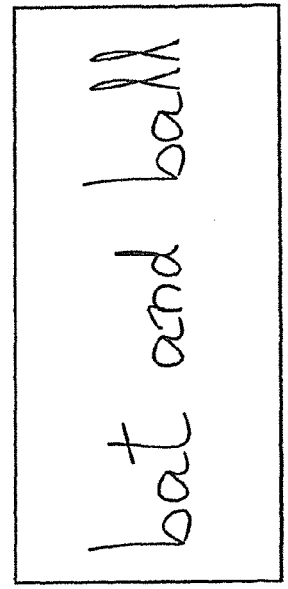
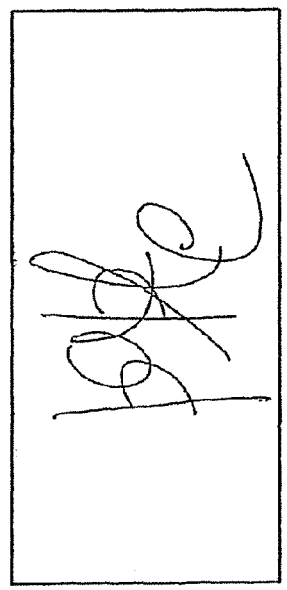 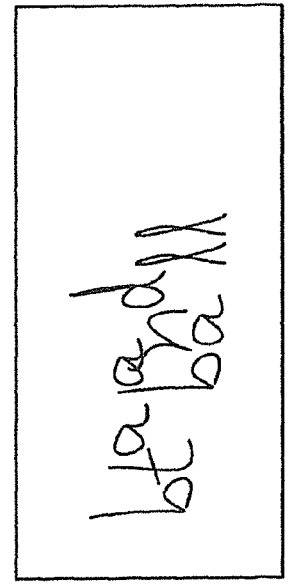
FIG. 3A
FIG. 3B

METHOD AND SYSTEM FOR ATTENTION-FREE USER INPUT ON A COMPUTING DEVICE

RELATED APPLICATIONS

Benefit is claimed under 35 U.S.C. 119(a)-(d) to Foreign application Ser. 918/CHE/2007 entitled "METHOD AND SYSTEM FOR ATTENTION-FREE USER INPUT ON A COMPUTING DEVICE" by Hewlett-Packard Development Company, L.P, filed on 30 Apr. 2007, which is herein incorporated in its entirety by reference for all purposes.

BACKGROUND OF THE INVENTION

Popularity of computing devices is growing day by day. Whether it is a computer desktop, a laptop, a tablet PC, a mobile phone or a personal digital assistant, using a computing device to accomplish a variety of personal and professional tasks has become a routine for most people in the present day world.

Many computing devices these days provide a touch screen or touch pad based user interface wherein a user input is obtained either through the user's finger or a stylus. The user can simply write in his or her natural handwriting on the touch pad and the computing device accepts the handwriting as the input. The existing handwriting recognition based interfaces require input in the standard writing order for the script (for example, left to right in case of English), so that the spatial positioning of the characters and words that make up the input are maintained. For example, the characters and words need to be approximately the same size, written next to one another, aligned with a (imaginary or displayed) baseline. Such input methods require user attention to writing, i.e. the user has to look at the writing surface (say, an external tablet) to make sure that the input is spatially correct and the position of each unit of writing, with respect to the other is maintained. In cases where the writing surface is different from the application display surface, the user has to look at writing surface while writing, and then at the display to see the results of recognition. This constant switching between the display device and writing surface after each writing unit results in significant cognitive load on the user, and greatly reduces the speed of entry. The present invention provides an attention-free user input mechanism for computing devices.

BRIEF DESCRIPTION OF THE DRAWINGS

An embodiment of the invention will now be described, by way of example only, with reference to the accompanying drawings in which:

FIGS. 3A and 3B illustrate exemplary text entry using the attention-free pen input method on a computing device.

DETAILED DESCRIPTION OF THE PREFERRED EMBODIMENT

There will be described a system and method for attention-free user input on a computing device. More particularly, there will be described a system and method for attention-free text input on a computing device Referring to FIG. 1, there is shown an exemplary block diagram depicting hardware components of a computing device which embodies the method of the present invention.

Figure 1:
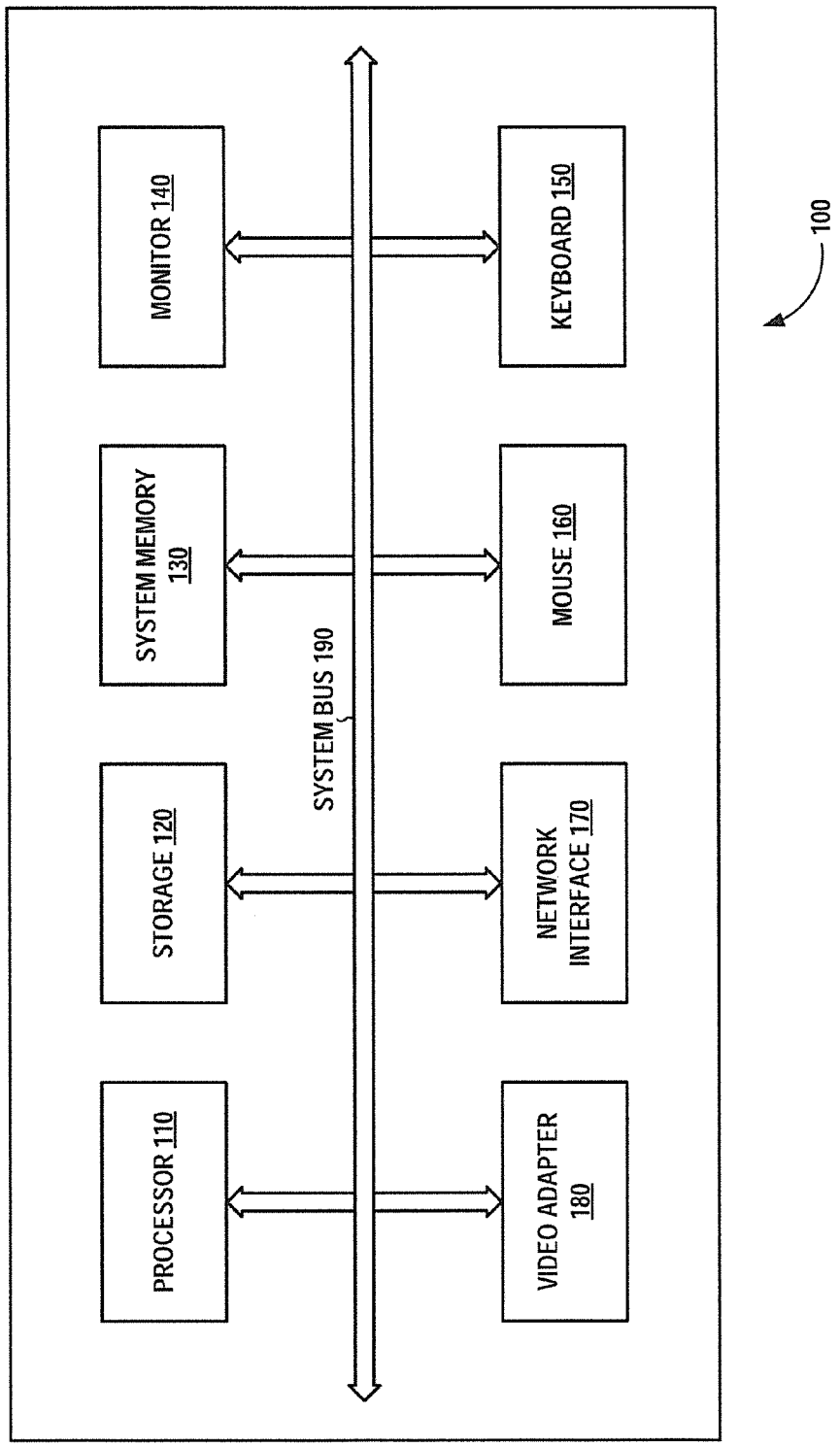
FIG. 1 illustrates an exemplary block diagram depicting hardware components of a computer system which embodies the method of the present invention.

In FIG. 1, a computing device 100 includes a processor 110, a storage medium 120, a system memory 130, a monitor 140, a keyboard 150, a mouse 160, a video adapter 180 and a network interface 170. These components are coupled together through a system bus 190.

The storage medium 120 (such as a hard disk) stores a number of programs including an operating system, application programs and other program modules. A user may enter commands and information into the computing device 100 through input devices, such as a keyboard 150, a touch pad (not shown) and a mouse 160. The monitor 140 is used to display textual and graphical information.

An operating system runs on processor 110 and is used to coordinate and provide control of various components within personal computing device 100 in FIG. 1.

It would be appreciated that the hardware components depicted in FIG. 1 are for the purpose of illustration only and the actual components may vary depending on the computing device deployed for implementation of the present invention. Further, the computing device 100 may be, for example, a desktop computer, a laptop computer, or a wireless device such as a mobile phone, a personal digital assistant (PDA), a hand-held computer, etc.

Figure 2:
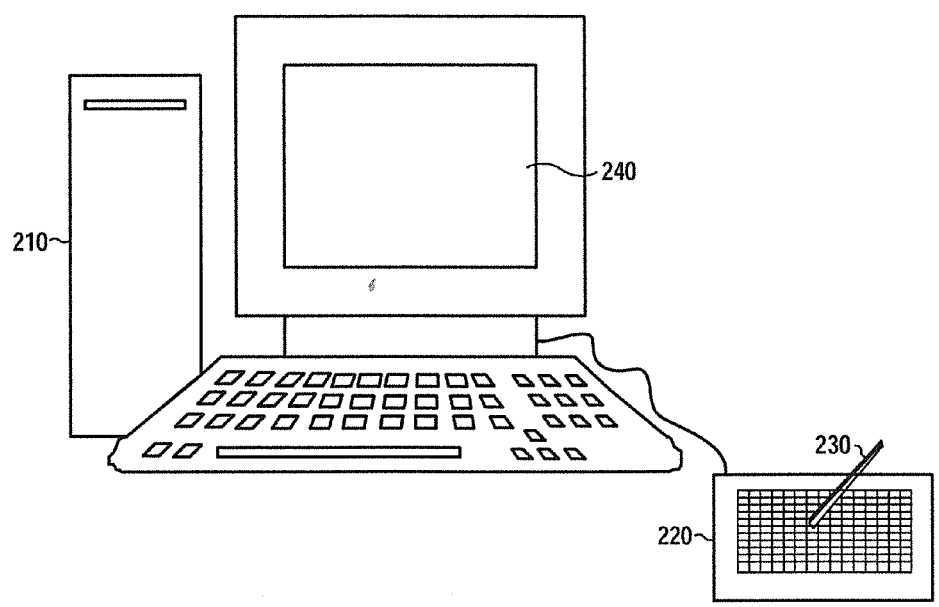
FIG. 2 illustrates a diagram of a computing system that may be used in accordance with an embodiment of the present invention.

FIG. 2 illustrates an exemplary computing system 200 that may be used in accordance with an embodiment of the present invention.

Computing system 200 includes a computing device 210, such as computing device of FIG. 1, a display 240, a digitizer 220 and a stylus 230.

Display 240 may be a cathode ray tube or some form of flat panel display such as a liquid crystal display (LCD). Display 240 may be used to present any textual information received as user input on digitizer. In an exemplary embodiment of the present embodiment, a user interface may be provided in the form of a computer program residing on computing device 210 to present user input on display 240.

Digitizer 220 may be integrated with display, or provided as a separate unit. It may be touch sensitive or electromagnetic. It may also be dual-mode, which allows a user to handwrite on the screen both with a pen and/or his or her finger.

Stylus 230 may be used to write on digitizer. It may be equipped with one or more buttons or other features to augment its selection capabilities.

In accordance with an embodiment of the present invention, an attention-free user input method is provided that allows a user to write on the digitizer 220 with a stylus 230. Upon recognition, the user input is displayed on display 240.

FIGS. 3A and 3B illustrate examples of text input using the attention-free input method of the present invention.

FIG. 3A illustrates the writing of the word "apple". In an exemplary embodiment of the present invention, a user uses a stylus to write the first character of the word "apple" i.e. "a" on a digitizer surface. And then, irrespective of the area of entry (on the digitizer surface) of the previous character (in this case "a") and/or without the need (although the user may) from the user to make a visual contact with the digitizer, the user writes the remaining characters (p, p, l and e) to complete the word. The end of the word may be, but not limited to, recognized by lifting the stylus from the digitizer surface for a predefined period of time, by using a special gesture or by pressing a key (such as a soft key) on the keypad associated with the computing device. Once the end of the word is recognized, the complete word is presented on display.

FIG. 3B illustrates the writing of the text "bat and ball". In the present case, the user writes all three words "bat", "and" and "ball", one by one, as a continuous string of characters, irrespective of the area(s) of entry (on the digitizer surface) of the previous character(s) or word(s) and/or without making a visual contact with the digitizer. Once all three words have been written by the user, the entire user input is presented on display for viewing.

Figure 4:
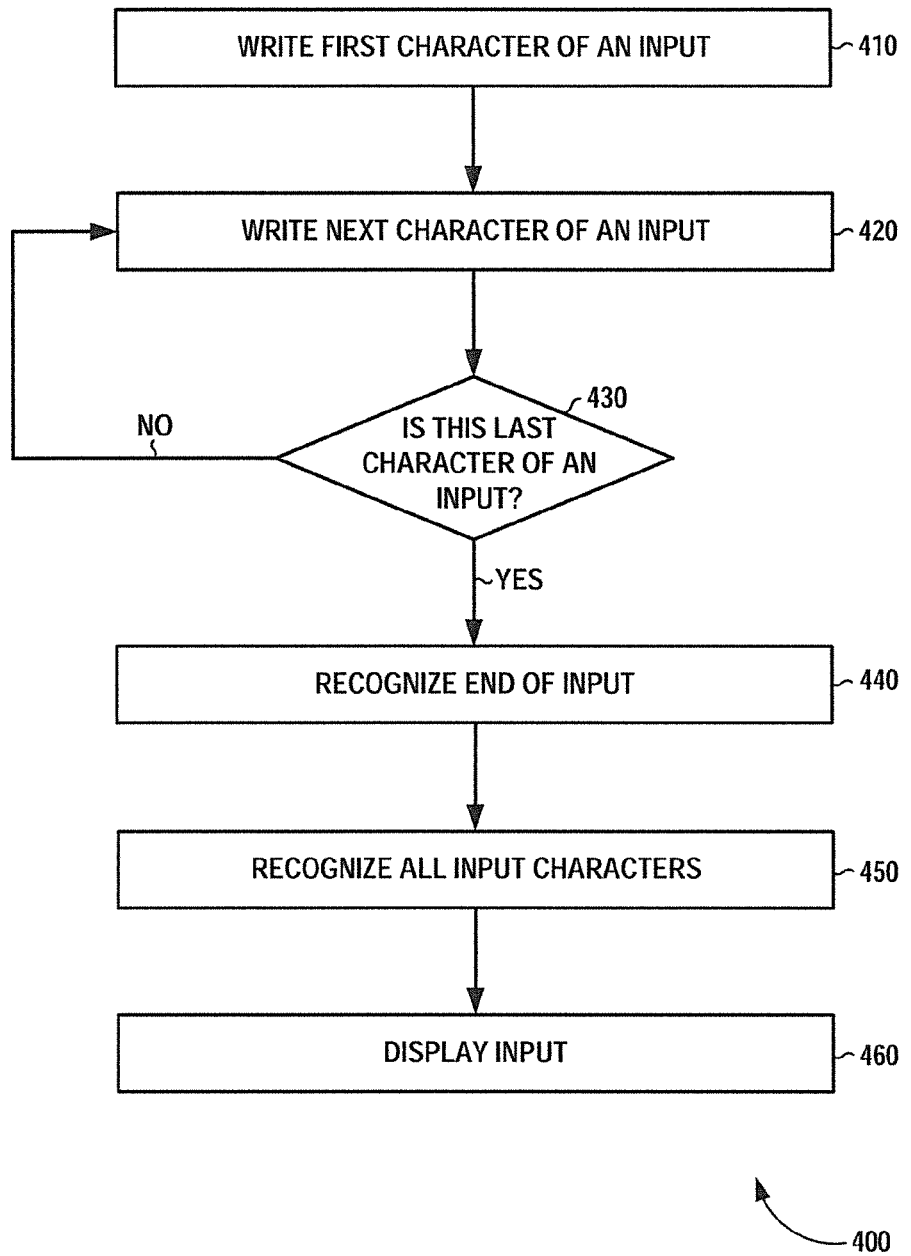
FIG. 4 provides a flowchart showing method steps for attention-free user input on a computing device.

FIG. 4 provides a flowchart showing method steps for attention-free user input on a computing device.

At step 410, a user writes the first character of an input word on a writing surface. The writing surface may be, for example, but not limited to, a digitizer surface. Further, the user may use a stylus or his/her finger to write on the writing surface.

At step 420, the user writes the next character of the word on the writing surface. The next character is written irrespective of the area of entry of the previous character (on the writing surface) and/or without the need (although the user may) from the user to make a visual contact with the writing surface.

At step 430, a determination is made as to whether the character entered at the last instance is the last character of the word (i.e. is it the end of the word)? As mentioned above also, the end of the word may be, but not limited to, recognized by lifting the stylus from the digitizer surface for a predefined period of time, by using a special gesture, or by pressing a key on the keypad associated with the computing device.

If the character entered at the last instance is not the last character of the word, the process returns to step 420 and the user continues to enter the remaining characters of the word until the end of the word is recognized at step 430.

If the character entered at the last instance is the last character of the word, the end of the word is recognized (440) and at step 450 a word recognition algorithm is used to recognize all the characters. In accordance with an embodiment of the present invention, the following algorithm may be used to perform word recognition.

1. A character received on a writing surface is divided into strokes (a series of points which represent one period of time during which the pen does not leave the writing surface; for example: the "hat" on a "5" is a stroke, the "body" is another stroke).
2. All strokes (s1 . . . sn) are considered in the temporal order of receipt, until the end of word indication is recognized.
3. All possible ways of partitioning the stroke sequence into contiguous subsequences (say for e.g. m letters, where m is an integer between 1 and n) are considered.
4. For each alternative in Step 3, each subsequence is recognized (as a letter) using a trained letter recognizer. The letter recognizer ignores the position of the letter on the writing surface (e.g. by translating the entire letter to the origin) and uses only the shapes (and/or with a lower degree of confidence) relative positions of strokes within the letter to recognize the letter.
5. The most likely partitioning is found, and letter sequence or word is recognized, based on letter recognition confidences, dictionaries, letter-transition probabilities, word frequency information, etc.

It would be appreciated that the above described word recognition algorithm is for the purpose of illustration only and other equivalent algorithms may also be used to perform word recognition. For example, steps 3-5 may be combined and performed using a Dynamic Programming search. More cursive styles of writing (where adjacent characters are written with a single stroke) can be accommodated by dividing strokes further into segments in step 1.

At step 460, the input characters are presented on display in their order of receipt on the writing surface.

It would be appreciated that although the above method has been described with reference to the input of a "single" word on a computing device, the said method is equally applicable to any number and combination of input characters, numerals, symbols and special characters, which may vary depending on the language of the user. The above method can be employed with any written language such as, but not limited to, Indic languages (for e.g. Hindi, Tamil, Telugu, Kannada, Marathi etc.). While in the examples, the word has been shown broken into discrete individual characters, variations of the method can also interpret input such as: (i) words entered in two or more fragments, where the fragments are (perhaps cursively) written in correct spatial order, but without regard to the positions of other fragments, (ii) the entire word entered cursively in a single stroke, but "compressed" to fit the writing area so that adjacent characters overlap.

The attention-free user input method may use a predictive text input mechanism (wherein only a part of the word is entered) to guess the complete word. The closest match (and/or other close alternatives) is offered to the user for selection. The user may indicate his or her acceptance of a choice by, for example, using a gesture, pressing a key or clicking a mouse button.

The above described method offers many advantages. It does not require user attention while writing on the digitizing surface, thereby reducing the cognitive load on the user.

The reduced cognitive load and eye movement allows faster text input since the user can focus more on the application display and the task at hand, rather than the text input device. Further, the method can use a smaller digitizer as compared to existing methods; hence the digitizer can be simpler and less expensive. Accordingly, the method is highly suitable for text input on small and portable devices with very small digitizers.

It will be appreciated that the embodiments within the scope of the present invention may be implemented in the form of a computer program product including computer-executable instructions, such as program code, which may be run on any suitable computing environment in conjunction with a suitable operating system, such as, Microsoft Windows, Linux or UNIX operating system. Embodiments within the scope of the present invention may also include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer.

It should be noted that the above-described embodiment of the present invention is for the purpose of illustration only. Although the invention has been described in conjunction with a specific embodiment thereof, those skilled in the art will appreciate that numerous modifications are possible without materially departing from the teachings and advantages of the subject matter described herein. Other substitutions, modifications and changes may be made without departing from the spirit of the present invention.

The invention claimed is:

1. A computer-implemented method for attention-free user input, the method comprising:
   receiving a first user input character on a writing surface;
   displaying the first user input character on the writing surface;
   receiving a next user input character on the writing surface on top of the displayed first user input character, wherein the next user input character is received irrespective of the area of entry of the first user input character on the writing surface without the user having to make a visual contact with the writing surface;
   determining whether the next user input character is the last user input character;
   recognizing user input when the next user input character is the last user input character, wherein recognizing the user input comprises:
      dividing each user input character into strokes, wherein a stroke of the strokes is a curve;
      partitioning the strokes into contiguous subsequences; and
      recognizing each subsequence as a letter, wherein the recognizing each subsequence as a letter includes using shapes and relative positions of strokes within the letter to recognize the letter and recognizing the letter ignores the position of the letter on the writing surface to recognize the letter; and
   displaying the user input in its order of receipt.

2. The method of claim 1, further comprising receiving further user input characters until the latest user input character is the last user input character, recognizing the user input and displaying the entire user input in its order of receipt.

3. The method of claim 1, wherein recognizing the user input comprises:
   recognizing at least one word as the user input based on the letter sequence using a word recognition algorithm.

4. The method of claim 1, wherein all strokes are considered in the temporal order of receipt on the writing surface.

5. The method of claim 1, wherein the subsequences are recognized using a letter recognizer.

6. The method of claim 1, wherein the writing surface is a digitizer.

7. The method of claim 1, wherein determination of the last user input character is recognized by lifting the stylus from the writing surface for a predefined period of time, by using a special gesture, or by pressing a key on the keypad associated with the computing device.

8. The method of claim 1, wherein recognition of the user input is carried out by using a word recognition algorithm.

9. The method of claim 1, wherein the user input character is a character from any writing system or language.

10. An apparatus for attention-free user input, the apparatus comprising:
    a processor; and
    a writing surface, wherein a first user input character is received on the writing surface, the first user input character is displayed on the writing surface, and a next user input character is received on the writing surface over the displayed first user input character, wherein the next user input character is received irrespective of the area of entry of the first user input character on the writing surface without the user having to make a visual contact with the writing surface;
    wherein the processor is to:
       determine whether the next user input character is the last user input character;
       recognize and display user input in its order of receipt when the next user input character is the last user input character, wherein to recognize the user input the processor is to divide each user input character into strokes, wherein a stroke of the strokes is a curve, partition the strokes into contiguous subsequences, and recognize each subsequence as a letter using shapes and relative positions of strokes within the letter and the recognizing of the letter ignores the position of the letter on the writing surface to recognize the letter, wherein the user input is displayed in its order of receipt.

11. The apparatus of claim 10, wherein further user input characters are received until the latest user input character is the last user input character, and the entire user input is displayed in its order of receipt.

12. The apparatus of claim 10, wherein the processor is to recognize at least one word as the user input based on the letter sequence using a word recognition algorithm.

13. A non-transitory computer readable storage medium storing computer program product comprising code, that when executed by a computer, cause the computer to:
    receive a first user input character on a writing surface;
    display the first user input character on the writing surface;
    receive a next user input character on the writing surface over the displayed first user input character, wherein the next user input character is received irrespective of the area of entry of the first user input character on the writing surface and/or without the user having to make a visual contact with the writing surface;
    determine whether the next user input character is the last user input character;
    recognize and display entire user input in its order of receipt when the next user input character is the last user input character, wherein to recognize the user input includes:
       divide each user input character into strokes, wherein a stroke of the strokes is a curve;
       partition the strokes into contiguous subsequences;
       recognize each subsequence as a letter, wherein the recognizing each subsequence as a letter includes using shapes and relative positions of strokes within the letter to recognize the letter and recognizing the letter ignores the position of the letter on the writing surface to recognize the letter; and
    display the user input in its order of receipt.

* * * * *